United States Patent
Olsen et al.

(10) Patent No.: US 7,571,036 B2
(45) Date of Patent: *Aug. 4, 2009

(54) SYSTEM, METHOD, AND APPARATUS FOR COLLECTING TELEMATICS AND SENSOR INFORMATION IN A DELIVERY VEHICLE

(75) Inventors: John Olsen, Cumming, GA (US); David Bradley, Alpharetta, GA (US); Rhesa Jenkins, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/254,031

(22) Filed: Oct. 20, 2008

(65) Prior Publication Data
US 2009/0051566 A1    Feb. 26, 2009

Related U.S. Application Data

(63) Continuation of application No. 11/033,051, filed on Jan. 10, 2005, now Pat. No. 7,457,693.

(60) Provisional application No. 60/535,316, filed on Jan. 9, 2004.

(51) Int. Cl.
*G01M 17/00* (2006.01)
(52) U.S. Cl. ............................ 701/35; 701/66; 180/287; 340/438
(58) Field of Classification Search .................. 701/33, 701/35, 66, 112; 180/287; 340/438, 506
See application file for complete search history.

(56) References Cited

U.S. PATENT DOCUMENTS 5,014,206 A    5/1991    Scribner et al.

(Continued)

FOREIGN PATENT DOCUMENTS

EP    0 635 800    1/1995

(Continued)

OTHER PUBLICATIONS

International Search Report for PCT/US2005/000789 dated Oct. 26, 2005.

(Continued)

*Primary Examiner*—Gertrude Arthur Jeanglaud
(74) *Attorney, Agent, or Firm*—Alston & Bird LLP

(57) ABSTRACT

The invention is directed to a data collection and evaluation system that includes a telematics device for collecting, time-stamping, and storing vehicle sensor data. Examples of the type of data collected include door data, ignition data, speed data, global positioning data, and diagnostic and trouble code data. The system further includes an external data acquisition device, such as a mainframe computer system or a hand-held computing device like an iPAQ. The external data acquisition device is configured to communicate with the telematics device over a wireless network, which enables the telematics device to transmit the time-stamped data to the external data acquisition device and receive information and instructions from the external data acquisition device. The ability of the system to automatically collect and transfer data and communicate with an external data acquisition device allows for the automation of fleet management processes, vehicle maintenance and repair processes, and certain security features.

37 Claims, 4 Drawing Sheets

U.S. PATENT DOCUMENTS

| | | | |
|---|---|---|---|
| 5,111,902 A | 5/1992 | Sundeen et al. | |
| 5,347,274 A | 9/1994 | Hassett | |
| 5,444,444 A | 8/1995 | Ross et al. | |
| 5,497,149 A | 3/1996 | Fast | |
| 5,500,516 A | 3/1996 | Durbin | |
| 5,528,758 A | 6/1996 | Yeh | |
| 5,534,684 A | 7/1996 | Danielson | |
| 5,635,693 A | 6/1997 | Benson et al. | |
| 5,648,770 A | 7/1997 | Ross | |
| 5,736,725 A | 4/1998 | Danielson | |
| 5,751,973 A | 5/1998 | Hassett et al. | |
| 5,797,134 A | 8/1998 | McMillan et al. | |
| 5,805,419 A | 9/1998 | Hundt et al. | |
| 5,808,564 A | 9/1998 | Simms et al. | |
| 5,834,749 A | 11/1998 | Durbin | |
| 5,835,377 A | 11/1998 | Bush | |
| 5,862,500 A | 1/1999 | Goodwin | |
| 5,867,382 A | 2/1999 | McLaughlin | |
| 5,919,239 A | 7/1999 | Fraker et al. | |
| 6,003,773 A | 12/1999 | Durbin et al. | |
| 6,034,379 A | 3/2000 | Bunte et al. | |
| 6,064,970 A | 5/2000 | McMillan et al. | |
| 6,071,643 A | 6/2000 | Chino et al. | |
| 6,084,528 A | 7/2000 | Beach et al. | |
| 6,124,806 A | 9/2000 | Cunningham et al. | |
| 6,134,437 A | 10/2000 | Karabinis et al. | |
| 6,148,262 A | 11/2000 | Fry | |
| 6,211,781 B1 | 4/2001 | McDonald | |
| 6,246,672 B1 | 6/2001 | Lumelsky | |
| 6,249,008 B1 | 6/2001 | Bunte et al. | |
| 6,285,916 B1 | 9/2001 | Kadaba et al. | |
| 6,408,233 B1 | 6/2002 | Solomon et al. | |
| 6,433,732 B1 | 8/2002 | Dutta | |
| 6,459,969 B1 | 10/2002 | Bates et al. | |
| 6,496,775 B2 | 12/2002 | McDonald, Jr. et al. | |
| 6,648,770 B1 | 11/2003 | Snyder | |
| 6,801,850 B1 | 10/2004 | Wolfson | |
| 6,819,267 B1 | 11/2004 | Edmark | |
| 6,868,386 B1 | 3/2005 | Henderson et al. | |
| 6,895,329 B1 | 5/2005 | Wolfson | |
| 7,034,683 B2 | 4/2006 | Ghazarian | |
| 7,457,693 B2 * | 11/2008 | Olsen et al. | 701/35 |
| 7,486,181 B2 | 2/2009 | Olsen et al. | |
| 2002/0024448 A1 | 2/2002 | Olesen | |
| 2002/0032517 A1 | 3/2002 | Buckelew et al. | |
| 2002/0044084 A1 | 4/2002 | Itoh et al. | |
| 2003/0083060 A1 | 5/2003 | Menendez | |
| 2003/0114206 A1 | 6/2003 | Timothy et al. | |
| 2003/0144985 A1 | 7/2003 | Ebert | |
| 2003/0163287 A1 | 8/2003 | Vock et al. | |
| 2003/0224818 A1 | 12/2003 | Nagasaka et al. | |
| 2004/0249557 A1 | 12/2004 | Harrington et al. | |
| 2006/0145837 A1 | 7/2006 | Horton | |
| 2006/0164232 A1 | 7/2006 | Waterhouse et al. | |

FOREIGN PATENT DOCUMENTS

| | | |
|---|---|---|
| EP | 1 216 901 A1 | 6/2002 |
| GB | 2 358 427 A | 7/2001 |
| GB | 2 363 884 A | 1/2002 |
| WO | WO 03/014752 A1 | 2/2003 |
| WO | WO 03/081560 A1 | 10/2003 |

OTHER PUBLICATIONS

International Search Report for PCT/US2005/000729 dated Oct. 26, 2005.

Murphy, Jean V., "Yard Management Systems Extend Automation Beyond the Dock Door", SupplyChainBrain.com, Mar. 2005, Global Logistic & Supply Chain Strategies.

International Search Report for PCT/US2005/000789 dated Jan. 10, 2006.

International Search Report and Written Opinion for PCT/US2005/000729 dated Jan. 10, 2006.

U.S. Appl. No. 12/341,124, filed Dec. 22, 2008.

* cited by examiner

SYSTEM, METHOD, AND APPARATUS FOR COLLECTING TELEMATICS AND SENSOR INFORMATION IN A DELIVERY VEHICLE

CROSS REFERENCE TO RELATED APPLICATIONS

This application is a continuation of U.S. patent application Ser. No. 11/033,051, filed on Jan. 10, 2005, now U.S. Pat. No. 7,457,693 which is hereby incorporated herein in its entirety by reference. U.S. patent application Ser. No. 11/033,051, further claims the benefit of U.S. Provisional Application No. 60/535,316, filed on Jan. 9, 2004, which is also hereby incorporated herein in its entirety by reference.

FIELD OF INVENTION

This invention relates to real-time vehicle monitoring and tracking systems and methods. More specifically, the present invention pertains to a telematics device configured to acquire information through multiple input interfaces and provide acquired information to an external data terminal. The device and its method of use are useful in the field of vehicle fleet management. In one embodiment, the device of the present invention collects data from sensors in the vehicle, stores the data, and communicates the data to a data terminal such as a Delivery Information Acquisition Device (DIAD), which is a portable computing device utilized by United Parcel Service to collect parcel delivery data.

BACKGROUND OF THE INVENTION

In vehicle fleet operations, efficient management of vehicle allocation, security, and maintenance and driver allocation and security are paramount tasks. For example, with a package delivery fleet system, delivery process elements, such as time traveled between stops, time of each stop, distance traveled, proximity to delivery point, routing of delivery points, and number of stops made per vehicle, can be analyzed to make the delivery and routing processes more efficient. Currently, for United Parcel Service (UPS), this data is manually collected. For example, a person rides in a vehicle for an entire day and uses a hand-held computing device, such as, for example, Hewlett Packard's iPAQ hand-held computing device, to enter data corresponding to various elements of the delivery process. This data is manually recorded by the person, entered into a database, and analyzed. This data collection process is time consuming and produces data that is often erroneous or outdated when utilized.

In addition, vehicle maintenance and repair functions are performed to ensure that vehicles are available for deployment when needed. Currently, vehicle maintenance schedules for each vehicle are maintained in a central database, and the database notifies automotive personnel to perform the scheduled maintenance function when due based on calendar-driven preventive maintenance schedules. Repair diagnostic tests are performed when maintenance personnel are made aware of a need for repair. Known maintenance schedule notification and repair processes are inefficient because the maintenance personnel are not always informed of maintenance and repair needs, and vehicle diagnostic tests can be time consuming and costly. Additionally, the potential delay in notifying maintenance personnel of a need to repair or perform maintenance procedures often renders a vehicle out of service or risks the safety of the vehicle and driver.

Furthermore, package delivery vehicle fleet operators must consider which security measures should be employed to most efficiently and effectively protect packages, vehicles, and drivers. Currently, security mechanisms are not automated and are seldom utilized. As a result, delivery drivers sometimes mistakenly leave a cargo or cab door unlocked, and the vehicle and inventory are susceptible to theft or damage.

Therefore, an unsatisfied need in the art exists for a real-time vehicle tracking and monitoring system that overcomes current challenges, some of which are described above.

BRIEF SUMMARY OF THE INVENTION

One embodiment of the present invention is directed to a system for automating the collection of vehicle sensor data for fleet operations. The system includes a telematics device and a portable data acquisition device accessible to a vehicle operator. The telematics device includes an input interface for collecting data from one or more sensors that are disposed within a vehicle, a processor for associating a time-stamp with at least a portion of the data, and a first data radio for wirelessly transmitting the data. The portable data acquisition device includes a second data radio for receiving the data from the first data radio of the telematics device, a memory for storing the data, and a data acquisition processor. The first and second data radios are configured to communicate via a wireless personal area network, such as a Bluetooth™ network.

One embodiment of the present invention is directed to a system for automating the collection of vehicle sensor data for fleet operations of a parcel delivery service. The system includes a telematics device and a portable data acquisition device accessible to a vehicle operator. The telematics device includes an input interface for collecting data from one or more sensors that are disposed within a vehicle, a processor for associating a time-stamp with at least a portion of the data, and a first data radio for wirelessly transmitting the data. The data includes a current global position of the vehicle. The portable data acquisition device includes a second data radio for receiving the data from the first data radio of the telematics device, a memory for storing the data, and a data acquisition processor.

The memory of the portable data acquisition device stores one or more pre-selected delivery positions, and the data acquisition processor compares the current global position to the pre-selected delivery positions. In one embodiment, the portable data acquisition device alerts the vehicle operator of the nearest delivery position to the current global position. In another embodiment, the portable data acquisition device provides an estimated time of arrival to each of the one or more pre-selected delivery positions to the operator. In yet another embodiment, the portable data acquisition device alerts the operator if a parcel associated with a particular delivery position is delivered to an incorrect delivery position.

The telematics device is capable of collecting other types of data, including the following: door data, electronic control module trouble and diagnostic codes, geo-fencing data, alarm signals, ignition data, mileage data, seat belt data, hazardous material data of cargo, entry process number, sensor data from engine, geographical position data, routing instructions for vehicle, weather data for route, or combinations thereof.

In another embodiment, a system for automating the collection of vehicle sensor data for fleet operations of a parcel delivery service includes a telematics device and a portable data acquisition device, which is accessible to a vehicle operator. The telematics device includes an input interface for collecting data from one or more sensors that are disposed within a vehicle, a processor for associating a time-stamp with at least a portion of the data collected from the sensors, and a first data radio for wirelessly transmitting the data to the portable data acquisition device. The portable data acquisition device includes a second data radio for receiving the data from the first data radio of the telematics device, a memory for storing the data, and a data acquisition processor. The memory of the portable data acquisition device stores threshold data parameters representative of normal vehicle operation conditions. The data acquisition processor compares the data collected by the telematics device to the data parameters in the memory and transmits an alarm signal if the collected data is outside of the data parameters. In another embodiment, the data acquisition processor compares the collected data to the data parameters in the memory of the data acquisition device over a time interval.

One embodiment of the invention provides a system for automating security features of one or more vehicles in a fleet. The system includes a telematics device disposed within a vehicle and a portable data acquisition device. The telematics device includes a first data radio for wirelessly transmitting data to the portable data acquisition device and an interface for communicating with a switching mechanism disposed within the vehicle. The switching mechanism can automatically lock or unlock doors of the vehicle and stop or prevent the vehicle's engine from running. The portable data acquisition device includes a second data radio and communicates wirelessly via the second data radio with the first data radio of the telematics device while the portable data acquisition device is within a particular geographical range of the telematics device. If the portable data acquisition device moves outside of the geographical range, the telematics device transmits a signal through the interface to the switching mechanism to lock the doors of the vehicle and to prevent the engine from running.

A fleet management system for automating security features of one more vehicles in a fleet, according to one embodiment, includes a telematics device disposed within a vehicle and an external data acquisition device. The telematics device includes a first data radio for wirelessly communicating with the external data acquisition device, and the external data acquisition device includes a second data radio for communicating wirelessly with the first data radio of the telematics device. The telematics device is further configured for detecting a security triggering event, and, in response, is configured to transmit a signal to the external data acquisition device. In one embodiment, the security triggering event is the receipt of an alarm signal from a portable data acquisition device.

In one embodiment, the telematics device is configured for paging a facility in response to receiving the security triggering event. In yet another embodiment, the external data acquisition device is a portable data acquisition device, and in response to receiving the alarm signal from the telematics device, the portable data acquisition device is configured for notifying the operator of the vehicle. In yet another embodiment, the telematics device is configured for instructing a switching mechanism disposed within the vehicle to lock the doors of the vehicle and prevent the vehicle's engine from running in response to receiving the security triggering event.

One embodiment of the invention provides a system for managing traffic and equipment within a fleet facility hub. The system includes a telematics device disposed within a vehicle and an external data acquisition device. The telematics device includes a first data radio for wirelessly transmitting data to an external data acquisition device and an input interface for receiving data from sensors disposed within the vehicle. The data includes the vehicle's identity and the identity of any cargo and hazardous materials that are being transported within the vehicle. The external data acquisition device includes a second data radio that communicates wirelessly with the first data radio of the telematics device while the external data acquisition device is within a particular geographical range of the telematics device. If the telematics device is within the particular geographical range of the external data acquisition device, the telematics device is configured to transmit the data to the external data acquisition device. The data transmitted to the external data acquisition device can be used to allocate equipment at the facility, determine where in the facility the vehicle should park, and determine whether the vehicle is allowed to enter or exit a facility. A facility may include a parcel sorting hub facility, a railhead facility, or a seaport facility.

One embodiment of the invention includes a system for detecting whether a vehicle is unsecured. The system includes a telematics device and a portable data acquisition device. The telematics device includes an input interface for collecting data from one or more sensors disposed within a vehicle and a data radio for wirelessly transmitting the data to the portable data acquisition device. The data indicates whether one or more doors are locked or unlocked, whether the engine is running, and whether the vehicle is in motion. In response to the data indicating that the door is unlocked, the engine is running and the vehicle is not moving, the portable data acquisition device is configured for notifying an operator of the vehicle.

Another embodiment of the invention includes a system for automating the collection of vehicle sensor data for fleet operations of a parcel delivery service. The system includes a telematics device and an external data acquisition device. The telematics device includes an input interface for collecting data from one or more sensors that are disposed within a vehicle, a processor for associating a time-stamp with at least a portion of the collected data, and a first data radio for wirelessly transmitting the data. The external data acquisition device, which is located at a facility, includes a second data radio for receiving the data from the first data radio of the telematics device and a memory for storing the data. The data and an identity of the vehicle are uploaded to the external data acquisition device upon entry into or exit from the facility via the data radio. In one embodiment, the data and the vehicle's identity are transmitted over a wireless personal area network to an external data acquisition device.

One embodiment of the invention is directed to a method of collecting work study data for evaluating vehicle fleet operations. The method includes the steps of: (1) providing a telematics device within one or more fleet vehicles, wherein the telematics device is configured for communicating with one or more vehicle sensors disposed in the vehicle; (2) collecting, time-stamping, and storing data received from the one or more sensors using the telematics device; (3) in response to a pre-determined event, transmitting the data from the telematics device to an external data acquisition device via a wireless data radio; and (4) utilizing the data to perform work studies of vehicle and driver performance. In a further embodiment, the method also includes the step of utilizing the data to identify and send notification of vehicle repair and maintenance needs to the external data acquisition device via the wireless data radio.

Another embodiment of the invention includes a method of automating security functions for one or more vehicles in a fleet. The method includes the steps of: (1) providing a telematics device in one or more fleet vehicles, wherein the telematics device is configured for communicating with one or more vehicle sensors and a switching mechanism disposed in each of the vehicles, and the switching mechanism is configured for automatically locking or unlocking one or more doors of a vehicle and preventing the vehicle's engine from running; (2) providing a portable data acquisition device for communicating with the telematics device when the portable data acquisition device is within a certain range of the telematics device; and (3) in response to the portable data acquisition device being moved from within the certain range to outside the certain range such that the portable data acquisition device moves from a point where it is in communication with the telematics device to a second point where the portable data acquisition device is no longer in communication with the telematics device, securing the vehicle by transmitting a signal to the switching mechanism to lock one or more doors of the vehicle and prevent the engine from running, thus securing the vehicle.

One embodiment of the invention is directed to a method of automating security functions for one or more vehicles in a fleet. The method includes the steps of: (1) providing a telematics device in one or more fleet vehicles, wherein the telematics device is configured for communicating with one or more vehicle sensors, a switching mechanism disposed in each of the one or more vehicles, and a portable external data acquisition device, and the switching mechanism is configured for automatically locking or unlocking one or more doors of a vehicle and preventing the vehicle's engine from running; (2) providing a portable data acquisition device for communicating with the telematics device when the portable data acquisition device is within a certain range of the telematics device, wherein the portable data acquisition device is configured to transmit an alarm signal to the telematics device; and (3) in response to the portable data acquisition device sending an alarm to the telematics device, securing the vehicle by transmitting a signal to the switching mechanism to lock one or more doors of the vehicle and prevent the engine from running.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1A:
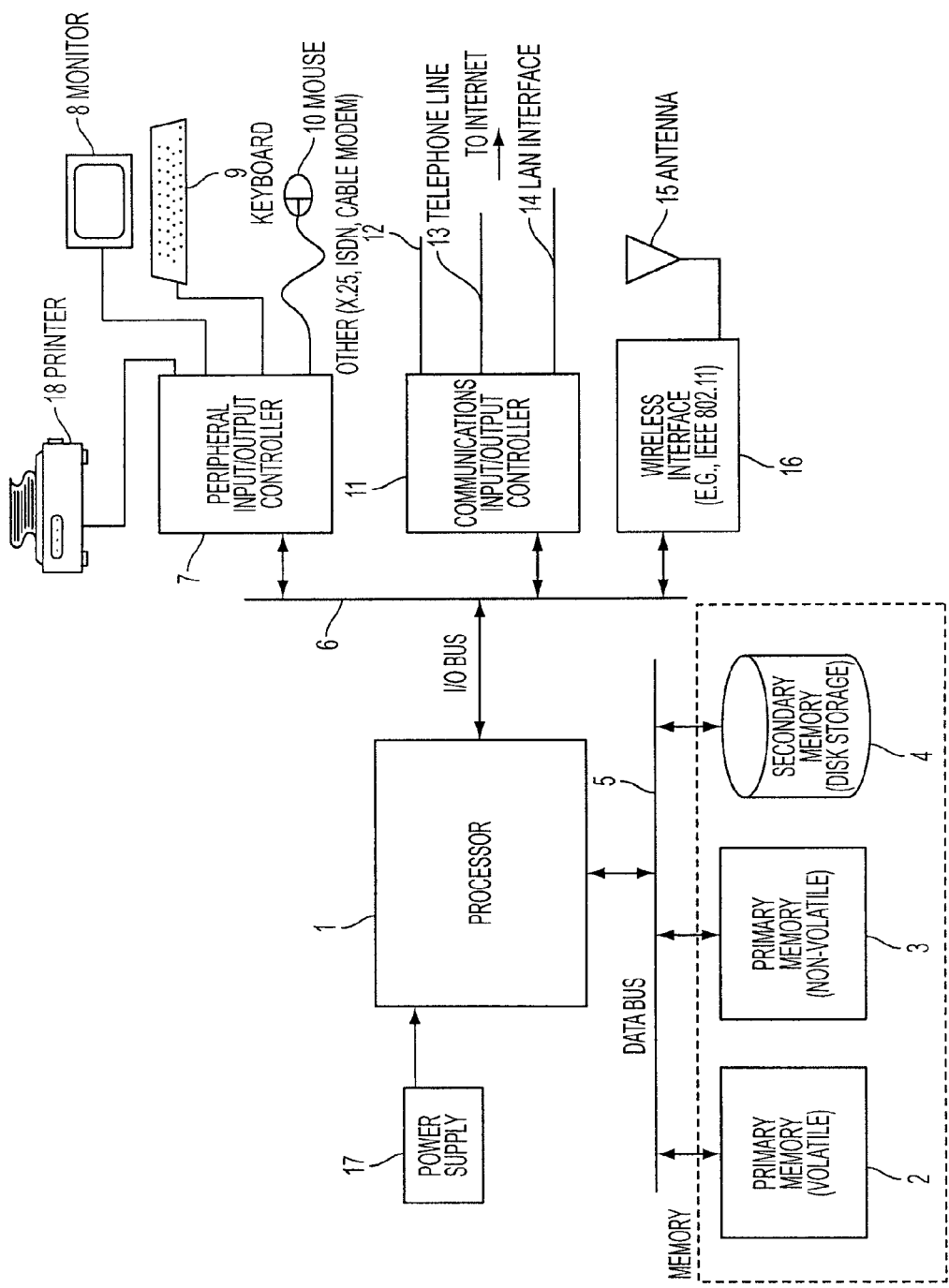
FIG. 1a shows an embodiment of a processing system that can be used to practice aspects of the invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Brief Summary

According to one embodiment, the data collection and evaluation system of the present invention includes a telematics device, such any off-the-shelf telematics device on the market, that collects, time-stamps, and stores vehicle sensor data. Examples of the type of data collected include door data indicating whether a door is open or closed, ignition data indicating whether the vehicle is turned on or off, oil pressure data, temperature data, speed data, global positioning data, seat belt data indicating whether a seat belt is buckled, and diagnostic and trouble code data.

The system further includes an external data acquisition device, such as a mainframe computer system, a local computer, or a hand-held computing device like an iPAQ. The external data acquisition device is configured to wirelessly communicate with the telematics device, allowing the telematics device to transmit the time-stamped data to the external data acquisition device and receive information and instructions from the external data acquisition device.

The ability of the system to collect and transfer data and provide communication between the telematics device and the external data acquisition device allows for the automation of fleet management processes, vehicle maintenance and repair processes, and certain security features. For example, the vehicle sensor data can be automatically collected and stored for analysis by existing work-study software programs, which perform work time studies on the vehicles and their drivers, including tracking the speed traveled by a vehicle against the global position of the vehicle, time at each stop, time between stops, distance traveled, number of stops per vehicle, and proximity to delivery point. Furthermore, the data can be compared with data ranges indicating normal operating conditions to determine if the vehicle is in need of immediate repair or if the driver is operating the vehicle improperly or unsafely. In addition, the telematics device can be used to automatically perform certain security functions, such as locking of doors and preventing the engine from starting when the driver is away from the vehicle and alerting the hub or nearest facility if the security of the vehicle is breached.

Exemplary System Architecture

As used herein, a computer, or other data acquisition device, may be a device having at least a means for entering information such as a keyboard, touch screen, scanner, etc. and a means for displaying information such as a display, etc. The computer will also be capable of receiving and/or transmitting information. Such information may be transported over a network that may be wired, wireless, optical, or combinations thereof. In one embodiment, the computer may contain a processor and a memory, although in other embodiments the processor and/or memory may reside elsewhere. The computer may be at a fixed location, such as a desktop, or portable, such as a hand-held device, i.e. an iPAQ or a DIAD as is used by UPS.

Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amounts of data. In some embodiments, the disk storage may communicate with the processor using an I/O bus 6 instead or a dedicated bus (not shown). The secondary memory 4 may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

Typically, the processor 1 communicates with external communication networks using a communications I/O controller 11 and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a local area network (LAN). Any of these interfaces may be used to access the Internet, intranets, LANs, or other data communication facilities.

Finally, the processor 1 may communicate with a wireless interface 16 that is operatively connected to an antenna 15 for communicating wirelessly with other devices, using for example, one of the IEEE 802.11 protocols, 802.15.4 protocol, or standard 3G wireless telecommunications protocols, such as CDMA2000 1x EV-DO, GPRS, W-CDMA, or other protocol.

Figure 1B:
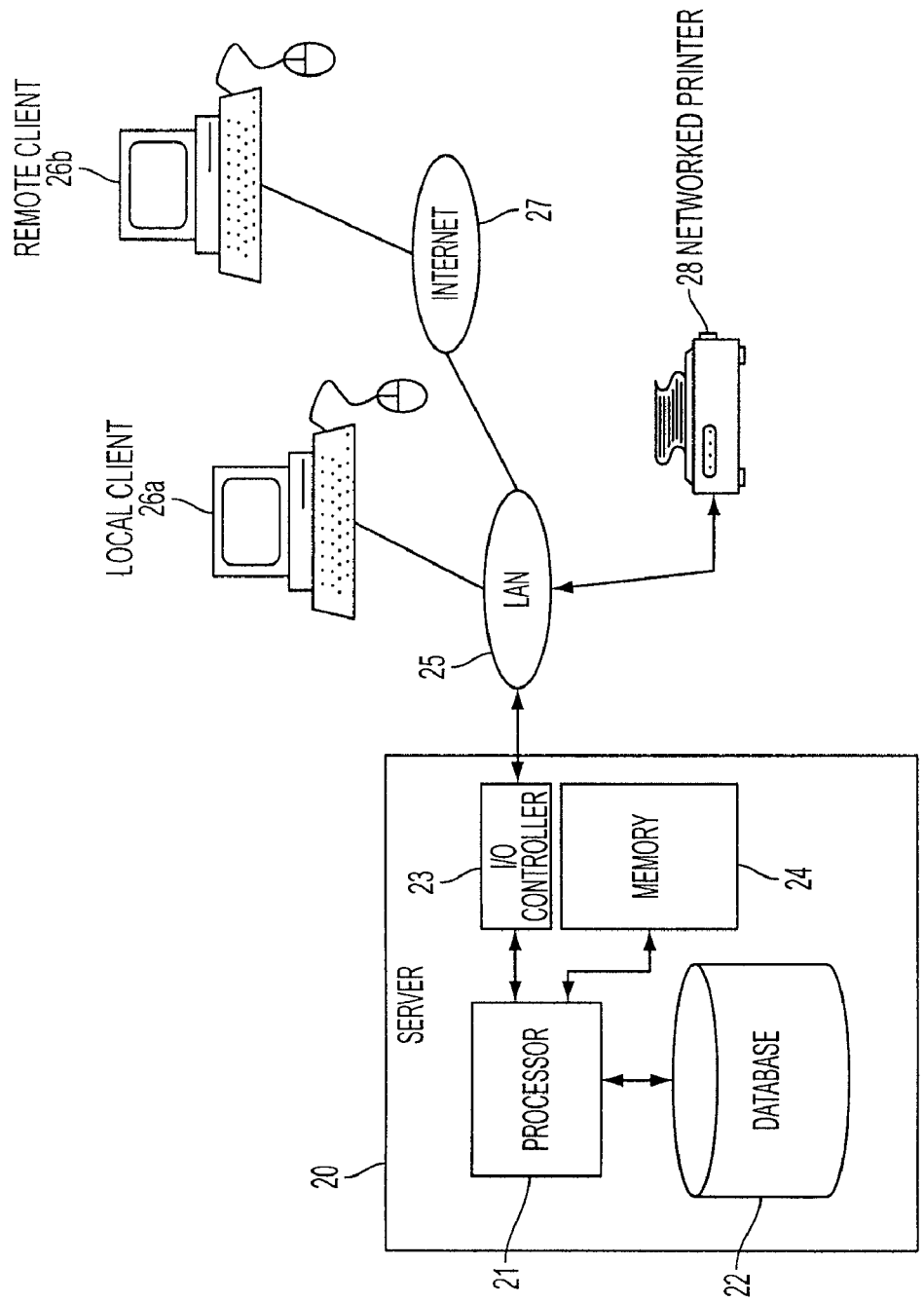
FIG. 1b shows an alternative embodiment of a processing system that can be used to practice aspects of the invention.

An alternative embodiment of a processing system than may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server 20, though not necessarily in the same room. Communication with remote devices typically is accomplished by routing data from the LAN 25 over a communications facility to the Internet 27. A remote client computer 26b may execute a web browser so that the remote client 26b may interact with the server 20 as required by transmitting data through the Internet 27, over the LAN 25, and to the server 20.

Those skilled in the art of data networking will realize that many other alternatives and architectures are possible and can be used to practice the principles of the present invention. The embodiments illustrated in FIGS. 1a and 1b can be modified in different ways and be within the scope of the present invention as claimed.

Figure 2:
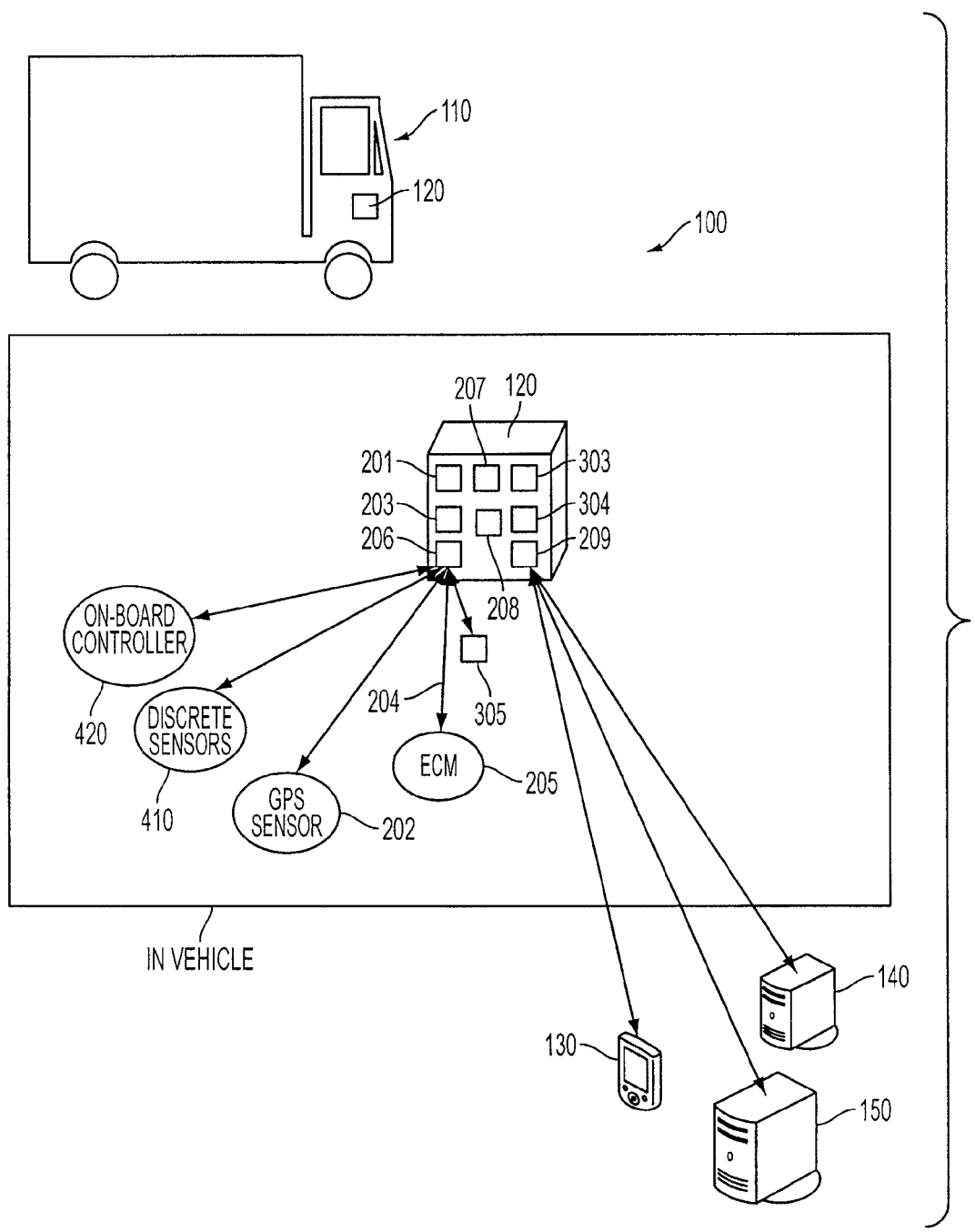
FIG. 2 shows various elements of a telematics system, according to one embodiment of the present invention.

FIG. 2 shows various elements of a telematics system 100 in accordance with an embodiment of the present invention. As explained in greater detail below, the telematics device 120 collects vehicle sensor data and transmits the data to an external data acquisition device 130, 140, 150 via one of several communication methods.

In one embodiment, the telematics device 120 includes some or all of the following components: a processor 201, a global positioning system (GPS) sensor 202, a real-time clock 203, J-Bus protocol architecture 204, an electronic control module (ECM) 205, a port 206 for receiving data from discrete sensors in a vehicle, a communication port 207 for receiving instruction data, a radio frequency identification (RFID) tag 305, a power source 208, a data radio 209 for communication with a wireless wide area network (WWAN), a wireless local area network (WLAN) and/or a wireless personal area network (WPAN), FLASH, DRAM, and NVRAM memory modules 303, and a programmable logic controller (PLC) 304. In an alternative embodiment, the RFID tag 305, the GPS sensor 202, and the PLC 304 may be located in the vehicle external to the telematics device 120.

In one embodiment, a GPS sensor 202 is one of several components available in the telematics device 120. The GPS sensor 202 is compatible with a low Earth orbit (LEO) satellite system or a Department of Defense (DOD) satellite system. The GPS sensor 202 is used to receive position, time, and speed data and perform geofencing functions. The sensor 202 also allows the telematics device 120 to communicate to an external data acquisition device 150, such as a mainframe computer system, via a WWAN. It will be appreciated by those skilled in the art that more than one GPS sensor 202 may be utilized and other GPS functions may be utilized.

In one embodiment, the ECM 205 with J-Bus protocol 204 is one of several components available in the telematics device 120. The ECM 205 is a scalable and subservient device to the telematics device 120. It has data processor capability to decode and store analog and digital inputs and ECM data streams from vehicle systems and sensors 410, 420, collect and present vehicle data to the J-Bus 204 (which allows transmittal to the telematics device 120), and output standard vehicle diagnostic codes when received from a vehicle's J-Bus-compatible on-board controllers 410 or sensors 420.

In one embodiment, on/off sensors, which register a voltage amount that corresponds with an on/off condition of the sensor, are disposed within the vehicle for collecting data. For example, door sensors that are connected, for example, to the driver side, passenger side, and bulkhead doors, register 0V when in an open position, and 12V when in a closed position. As another example, an ignition sensor registers 0V when the vehicle is off and 12V when the vehicle is turned on.

In one embodiment, variable voltage sensors, which are used to register variations in voltage, are disposed within a vehicle for collecting data. For example, oil pressure sensors detect the oil pressure by registering a particular voltage that corresponds to a particular oil pressure. The voltage of the sensor increases or decreases proportionately with increases or decreases in oil pressure. Other examples of variable voltage sensors include temperature and speed sensors.

In one embodiment, an instruction data receiving port 207 is one of several components available in the telematics device 120. Embodiments of the instruction data receiving port 207 may include an Infrared Data Association (IrDA) communication port, a data radio, or a serial port. The instruction receiving data port 207 receives instructions for the telematics device 120. These instructions may be specific to the vehicle 110 in which the telematics device 120 is installed, specific to the geographical area in which the vehicle 110 will be traveling, or specific to the function the vehicle 110 serves within the fleet.

In one embodiment, a radio frequency identification (RFID) tag 305 is one of several components available for use with the telematics device 120. One embodiment of the RFID tag 305 includes an active RFID tag, which comprises at least one of an internal clock, a memory, a microprocessor, and at least one input interface for connecting with sensors located in the vehicle or the telematics device 120. Another embodiment of the RFID tag 305 is a passive RFID tag. One or more RFID tags 305 may be internal to the telematics device 120, wired to the telematics device 120, or proximate to the telematics device 120. Each RFID tag 305 communicates wirelessly with RFID interrogators within a certain geographical range of each other. RFID interrogators may be located external to the vehicle or within a portable data acquisition device that can be carried in and out of the vehicle by the vehicle operator.

In one embodiment, a data radio 209 is one of several components available in the telematics device 120. The data radio 209 is configured to communicate with a WWAN, WLAN, or WPAN, or any combination thereof. In one embodiment, a WPAN data radio provides connectivity between the telematics device 120 and peripheral devices 130 such as a portable data acquisition device, a local computer, or a cellular telephone, used in close proximity to the vehicle. In one embodiment of the invention, a WPAN, such as, for example, a Bluetooth™ network (IEEE 802.15.1 standard compatible) is used to transfer information between the telematics device and a peripheral device. In other embodiments, WPANs compatible with the IEEE 802 family of standards are used. The IEEE 802 family of standards are hereby incorporated by reference in their entirety and made a part hereof. In one embodiment, the data radio 209 is a Bluetooth™ serial port adapter that communicates wirelessly via WPAN to a Bluetooth™ chipset located in a peripheral device 130. One of ordinary skill in the art will readily recognize that other wireless protocols exist and can be used with the present invention.

In an embodiment of a telematics system 100, the peripheral device 130 is a portable data acquisition device, such as, for example, the DIAD currently employed by UPS that collects, stores, and transmits package-tracking information. In one embodiment, vehicle performance and tracking data collected by the telematics device 120 (called telematics data) is transmitted via a WPAN to and stored with the portable data acquisition device 130 until a communication link is established between the portable data acquisition device 130 and a local computer or a mainframe computer system. In one embodiment, the portable data acquisition device 130 displays telematics data for the driver's viewing, which is helpful in troubleshooting vehicle performance problems and showing delivery route progress and instructions. In an alternative embodiment, the portable data acquisition device 130 is a hand-held data acquisition device, like an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which assists in identifying and allowing communication among vehicles, cargo, and portable data acquisition devices equipped with Bluetooth™ devices.

In one embodiment of a telematics system 100, a WLAN data radio in a telematics device 120 provides connectivity between the telematics device 120 and in-building or local data terminal devices 140 when the telematics device 120 is within a confined geographic area such as a carrier facility or near a package pickup or delivery location. Examples of WLAN data network protocols that could be supported include IEEE 802.11 protocol and ETSI HiperLAN/2 protocol. In one embodiment, the WLAN data radio bypasses the transmission of telematics data to a portable data acquisition device 130 via a WPAN and allows direct communication between the telematics device 120 and a local data acquisition device 140, such as a local computer.

In one embodiment of a telematics system 100, a WWAN data radio in the telematics device 120 provides real-time communication between the telematics device 120 and a remote data acquisition device 150. In this embodiment, the telematics device 120 bypasses the transmission of telematics data through a peripheral 130 or local data acquisition device 140 and communicates directly with a remote data acquisition device 150, such as a mainframe computer system. Data network protocols and frequencies that are supported include, but are not limited to, the global system for mobile communications (GSM)/general packet radio service (GPRS), dual-mode advanced mobile phone service (AMPS)/circuit switched data and code division multiple access (CDMA/1XRTT), DataTAC, Mobitex, and satellite communication via GPS systems such as LEO or DOD. Other network protocols and frequencies are known in the art and can be supported as well.

Exemplary System Operation

The operation of the data collection and evaluation system is described below in the context of a parcel delivery fleet. However, it should be recognized that one of skill in the art would know how to adapt the system to another type of vehicle fleet, such as train, shipping, and trucking operations.

Figure 3:
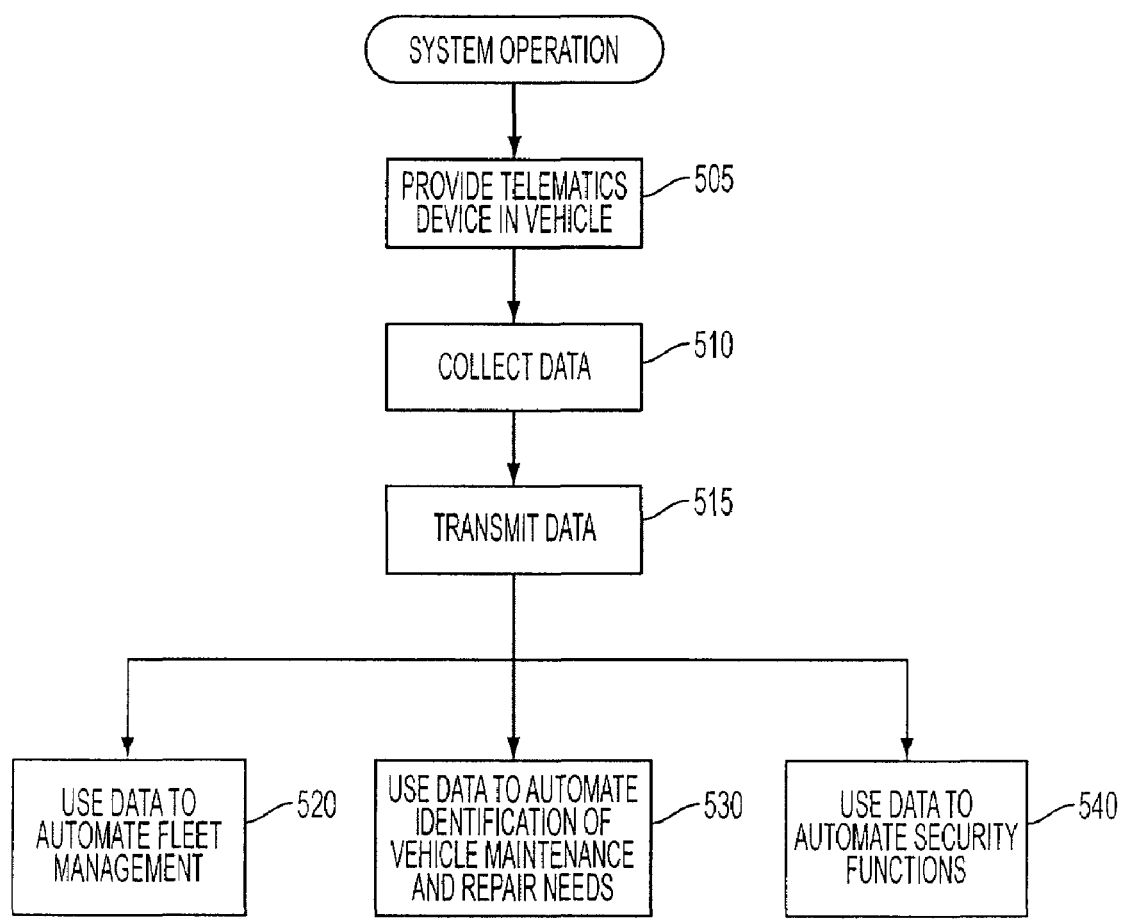
FIG. 3 shows a flowchart of the operation of the system according to one embodiment of the present invention.

FIG. 3 illustrates a flowchart of the operation of the system 100 according to one embodiment of the invention. In Step 505, a telematics device is provided within a vehicle 110. In Step 510, the telematics device 120 collects data from the ECM 205 and other vehicle sensors 410, 420, including, but not limited to, door sensors, engine sensors, temperature sensors, pressure sensors, and a GPS sensor 202. The processor 201 in the telematics device 120 associates the data with a time-stamp, which is provided by the clock 203 in the telematics device 120, and the time-stamped data is stored in a memory 303 in the telematics device 120.

In one embodiment, the telematics device 120 is programmed to collect data in response to collection triggering events. Examples of collection triggering events include the receipt of an RF signal by RFID tag 305 transmitted from an RFID interrogator, receipt of a MAC address from a nearby WPAN-enabled device, receiving a communication from an external device, receiving a voltage signal that the ignition of the vehicle 110 has been started, receiving sensor information that the vehicle 110 has reached a pre-determined speed, or receiving a manual trigger, such as a signal sent when a button is depressed on the dashboard of the vehicle 110. Collection triggering events can also include time intervals, such as instructions to collect data every five seconds or every five minutes. The time intervals can be limited to collecting data at a particular time interval during the course of a route, during a day, or between stops.

Any of the above examples of collection triggering events may be combined to prompt data collection by the telematics device 120. For example, the telematics device 120 may be programmed to collect data when the vehicle 110 is started and every five minutes thereafter until the end of the route. As another example, the data collection may be set to occur when the telematics device 120 receives a manual trigger or when the vehicle 110 reaches a certain speed and every two minutes thereafter until the vehicle 110 is turned off.

As mentioned above, according to one embodiment, the telematics device 120 is prompted to collect data in response to receiving an RF signal from an RFID interrogator. When the RFID tag 305 receives an RF signal from an RFID interrogator, the telematics device 120 collects and time-stamps data from the vehicle sensors 410, 420. In a further embodiment, if the RF signal is the first RF signal received after the engine has been started, the RF signal also prompts the telematics device to reset the clock. RFID interrogators can be located at the gate of a facility, signaling to the RFID tag 305 as the vehicle enters or leaves the facility. In addition, RFID interrogators can be located in an external data acquisition device 130, 140, 150, signaling to the RFID tag 305 when the vehicle is within range of the RFID interrogator in the external data acquisition device 130, 140, 150.

Referring back to FIG. 3, in Step 515, the stored time-stamped data is transmitted to an external data acquisition device via a data radio 209. In one embodiment, the data is transmitted to a portable data acquisition device 130, such as, for example, an iPAQ or a DIAD. The data transmitted to the portable data acquisition device 130 is later uploaded to a local computer or a mainframe computer system 150 via a WLAN, a WWAN, an infrared signal, or a wired connection. In an alternative embodiment, the data is transmitted directly to the local computer or mainframe computer system 150 from the telematics device 120 via a WLAN or a WWAN.

In one embodiment, upload triggering events prompt the transmission of data from the telematics device 120 to the external data acquisition device 130, 140, 150. These upload triggering events can be any of the collection triggering events described above. For example, in a further embodiment, an RFID interrogator is located at the gate of a facility and signals to the RFID tag 305 in communication with the telematics device 120 to prompt the upload of data upon the vehicle's entry or exit from the facility. This embodiment streamlines entry and data collection processes by automatically associating the identity of the vehicle 110 transmitted by the RFID tag 305 with the data uploaded from the telematics device 120. In an alternative embodiment, an upload triggering event occurs when the telematics device 120 detects a MAC address from a nearby external data acquisition device that is in communication with a WPAN and data from the ignition sensor indicates that the ignition is off. Upon detecting this upload triggering event, the telematics device 120 uploads the data to the external data acquisition device.

Finally, the data can be used by an external data acquisition device 130, 140, 150 to automate certain fleet management functions, as shown in Step 520, automate the identification and notification processes of vehicle maintenance and repair needs, as shown in Step 525, and automate security functions, as shown in Step 530. Each of these functions is discussed in more detail below.

In addition, the telematics device 120 and the external data acquisition device 130, 140, 150 can communicate with each other, allowing the external data acquisition device 130, 140, 150 to send messages and instructions to the telematics device 120, which can be communicated to the driver. In one embodiment, messages and instructions from a hub facility are received by the portable data acquisition device 130 and then are transmitted via a WPAN or other network to the telematics device 120. In another embodiment, the messages and instructions are received directly by the telematics device 120 and transmitted, when appropriate, via a WPAN or other network to the portable data acquisition device 130.

The following sections provide examples of how the telematics system 100 provides for the more efficient management of fleet operations and vehicle maintenance and repair needs and implementation of security features to protect vehicles and vehicle operators.

Fleet Management and Work Studies of the Delivery Process

The data collected by the system 100 is used to perform work studies on fleet operation processes, such as the delivery process and the pickup process. By automatically collecting, time-stamping, and transmitting the data to a mainframe computer system 100, work element measurement activity is significantly reduced and possibly eliminated. Furthermore, the data collected can be used to track the delivery and pick-up processes and identify steps that can be performed more efficiently. Other functions include the ability to customize asset management, inventory tracking, and security applications with respect to the territory being dispatched.

The GPS sensor 202 provides data indicating the current geographical position of the vehicle 110. This data is used, for example, to provide real-time vehicle tracking and real-time polling of the vehicle 110. In addition, having the current geographical position of the vehicle 110 allows fleet operators to automate geo-fencing functions for the fleet and determine when and how often a vehicle 100 travels outside of the geo-fenced area. "Geo-fencing" refers to setting geographical position parameters that define a geographical area and tracking a vehicle to determine if it travels in or out of the defined geographical area. In one embodiment, the telematics device 120 communicates an alarm or other signal when the vehicle 110 moves outside the defined geographical area. In another embodiment, the telematics device 120 communicates an alarm or other signal when the vehicle 110 moves inside the geographical area.

The system 100 also compares upcoming delivery points with the current global position indicated by the GPS data and communicates to the driver the vehicle's proximity to upcoming stops. This reduces walk time associated with park position error and possibly eliminates mis-delivery claims and associated driver follow-ups. Mis-delivery claims arise when parcels are delivered to the wrong address. By comparing current vehicle position with the delivery data associated with the parcel, the system 100 detects potential mis-deliveries in real-time and notifies the operator before the vehicle 110 leaves the delivery location.

In one embodiment, real time position, downloaded dispatch, and real time travel conditions are analyzed to determine an estimated time of arrival for delivery and pick-up services. The real time estimation can be provided to customers or used to assist fleet managers in determining whether to dispatch additional vehicles to a particular area when delays are expected. In one embodiment, the estimated time of arrival (ETA) is communicated to computers located at upcoming delivery points via a wireless data network, the Internet, or other type of network to inform customers of the ETA. In another embodiment, if a customer wants to receive a particular parcel earlier than the ETA predicted for the customer's delivery location, the customer can identify another delivery location that has an earlier ETA and arrange to meet the vehicle at the delivery location at the estimated time to pick up the parcel.

Fleet managers can also use collected GPS data to track when GPS signals are lost and forecast when and where the GPS signal may be lost in the future. In one embodiment, when the GPS sensor 202 loses its GPS signal, the telematics device 120 collects data from an inertia sensor, which tracks inertial movements of the vehicle 110. The data collected from the inertia sensor, in combination with a time-stamp, allows the telematics device 120 or an external data acquisition device 130, 140, 150 that receives the data to estimate the movement of the vehicle 110 while the GPS sensor 202 was unable to receive a signal, which assists in automating the geo-fencing function, defining the areas in which GPS signals were lost, and continuing to provide the functions described above that use the global positioning data. In another embodiment, the system 100 provides for integrating the GPS and/or inertial sensor data with device (DIAD) based dead reckoning to allow for automatic determination of vehicle position and delivery point position. In addition, in one embodiment, the telematics device 120 tracks cellular signal outages against global position data, which can be used later to forecast future losses of cellular signal.

In addition, the RFID tag 305 in the vehicle can be used to locate a particular vehicle 110 in a hub facility yard. In one embodiment, RFID interrogators are positioned at fixed locations within a hub facility yard. An interrogator receives a signal from the RFID tag 305 when the vehicle 110 is within an interrogator's read zone, which is the geographic area proximate the interrogator in which RFID tags can communicate with the interrogator. By identifying the location of the RFID interrogator that captured the RFID tag 305 for the vehicle 110, the vehicle's approximate position in the yard can be determined. In an alternative embodiment, the MAC address of the telematics device 120 is detected by a WPAN-enabled device positioned at a known location in the hub facility yard, and the position of the access point and its communication range are used to estimate the vehicle's location in the facility yard.

In one embodiment, the telematics device 120 receives data from a proximity sensor positioned on the back of the vehicle. This sensor is used to detect the vehicle's proximity to another object. The telematics device 120 can be programmed to send a signal to the driver when the vehicle is within a certain distance of another object, which assists the driver in determining how to maneuver the vehicle. This provides an added safety feature for the vehicle 110 and the object behind it and reduces the amount of time the driver spends estimating the vehicle's proximity to objects behind it.

In one embodiment, the RFID tag 305 communicates with a facility to notify the facility of the vehicle's arrival or departure. An RFID interrogator is positioned at the gate of the facility, and when the vehicle passes by the interrogator, the RFID tag 305 sends a signal to the RFID interrogator identifying of the vehicle. In a further embodiment, portions of the cargo within the vehicle 110 may include RFID tags, and these tags also communicate their identity to the RFID interrogator, which allows the mainframe computer system at the facility to associate the cargo with the vehicle 110 and further automates the process of tracking cargo. In another embodiment, the portable data acquisition device 130 contains an RFID interrogator and receives signals from RFID tags located on cargo within the vehicle 110. The portable data acquisition device 130 can communicate the identity of the cargo located on the vehicle 110 to the telematics device 120 via a WPAN or to the hub facility's mainframe computer system 150. In yet another embodiment, Bluetooth™ devices are secured to cargo disposed within the vehicle, and the identity of the cargo is detected by the MAC address of the Bluetooth™ devices on each piece of cargo.

The data collection and evaluation system 100 of one embodiment of the invention can also track untethered trailers and containers, trailers-on-flatcars (TOFCs), and containers-on-flatcars (COFCs) by receiving signals that identify each trailer or container. In one embodiment, the trailers and containers are equipped with devices that include an antenna, a transmitter, and a battery pack. The location of the trailers and containers are tracked by receiving a signal transmitted from the battery-powered transmitter located within the trailer or container. Either the telematics device 120 or another data acquisition device 130, 150 can be used to receive the signals transmitted from the trailers or containers. In one embodiment, the signals are MAC addresses from Bluetooth™ devices, and in another embodiment, the signals are RF signals from RFID tags.

The RFID tag 305 can also be utilized to streamline the scale process, for example, by identifying the vehicle being weighed, automatically associating the vehicle's identification with its weight, and storing this information in the telematics device 120, an external data acquisition device 130, 140, 150, or an external database at the scale facility. In an alternative embodiment, the identification of the vehicle can be communicated to the scale facility via the data radio 209 in the telematics device 120, or the MAC address of the WPAN-enabled data radio can be used to identify the vehicle. Additionally, the RFID tag 305 can be used to streamline the trailer/dolly number entry process, for example, by identifying the vehicle 110 entering or leaving a facility through direct or indirect communication with the telematics device 120, and in one embodiment, uploading data stored in the telematics device 120 to a mainframe computer system upon entering or leaving a facility via a WPAN. Alternatively, the MAC address of the telematics device 120 serves to identify the vehicle 110 as the vehicle 110 enters or leaves a facility.

In addition to being able to communicate data to a remote external data acquisition device 150 via a WWAN, the telematics device 120 is able to receive messages and instructions from the remote external data acquisition device 150. The messages can be displayed on a display screen disposed within the vehicle 110 or played over the vehicle's sound system. In one embodiment, the messages to be displayed on a screen in a vehicle or played over the vehicle's sound system are transmitted to the display or sound system via a WPAN. In another embodiment, the messages can be communicated to a portable data acquisition device 130 via a WPAN, and the portable data acquisition device 130 can display or play the messages. The portable data acquisition device 130 can also be used to type messages to be sent to the facility or, if the device includes a telephone feature, send audible messages to the facility. The messages may be sent directly from the portable data acquisition device 130, or the messages can be sent via a WPAN or WLAN from the portable data acquisition device 130 or local computer 140 to the telematics device 120 and from the telematics device 120 to the remote external data acquisition device 150 at a facility via a WWAN.

The ability of the telematics device 120 to communicate via a WWAN with a facility allows a dispatch facility to send instructions for the vehicle operator while the vehicle 110 is traveling on its route. Additionally, it allows the telematics device 120 to receive notification from a facility as to equipment on the property, and fleet operators can receive notification of the vehicle's arrival, allowing the operators to manage power equipment, trailers, dollies, and chassis equipment more efficiently. The vehicle 110 can also receive real time route guidance, or directions, when, for example, a driver has to drive on a foreign route or receive detour instructions for a route, receive daily information such as weather conditions, route instructions, and special instructions for parcels being transported by the vehicle 110. Furthermore, the driver can report traffic conditions in real-time to the facility, which allows the facility to make any route adjustments.

Knowing the location of a vehicle 110, such as by its global position using a GPS sensor 202 or by an RFID interrogator's position in a yard of a facility, and the cargo it contains allows fleet operators to forecast TOFC and COFC arrivals and departures and traffic density in facilities, rail yards, and ports, all in real time. In addition, the facility can better estimate the arrival time of a vehicle 110. Thus the facility can direct vehicles to a certain area of the facility or have certain equipment ready to handle the incoming vehicles. Facilities may include a parcel sorting facility, a railroad facility, or a seaport facility, for example.

As mentioned earlier, the telematics device 120 can also communicate via a WLAN or WPAN with computers located at a pick-up or delivery location. These computers can send a message to the telematics device 120 or the portable data acquisition device 130 in a vehicle within the communication range of the computers to notify the vehicle operator as to whether the vehicle 110 needs to stop, preventing unnecessary stops and ensuring that stops are not accidentally skipped. In addition, in one embodiment, the portable data acquisition device includes delivery data for each customer, and this customer-specific data can be transmitted to the local computer of a customer before the vehicle arrives at the customer's location, allowing the customer to prepare for cash-on-delivery (COD) payments or mobilize personnel or equipment to handle the incoming delivery or pick-up load. In another embodiment, the hub facility can send messages for a particular operator to a computer located at a future delivery location, such as over the Internet or other network. When the vehicle arrives at the customer's location, the computer, which is in communication with a WPAN, communicates the message to the portable data acquisition device 130 or the telematics device 120 via the WPAN. In one embodiment, the message is tagged to only transmit to the particular MAC address identifying the operator's portable data acquisition device or the telematics device.

Vehicle Maintenance and Repair

The data collected from vehicle sensors by the telematics device 120 can also be used to automate the notification and diagnosis of vehicle maintenance and repair needs. For example, in one embodiment, the data is compared with a range of values that indicate normal vehicle operating conditions. If the data value falls outside of the range, the telematics device 120 sends an alert signal or a message indicating the abnormal condition to the driver or maintenance and repair personnel. The alert signal or message may include, for example, a fault code, diagnostic code, or maintenance schedule request.

In another embodiment, the telematics device 120 can page an external data acquisition device 130, 140, 150 upon detection of an abnormal condition. For example, data indicating the tire pressure of each tire of a vehicle can be analyzed over a particular time periods, such as, for example, a week. A faster than normal decrease in the tire pressure of one or more tires can alert maintenance personnel to a potential tire problem.

In another embodiment, the data can also be used to identify driver errors that can cause harm to the vehicle. For example, the data collected can include pedal position and revolutions per minute of the engine at a particular point in time. Maintenance personnel can use the data to identify whether the operator has been starting the vehicle is second gear, which can reduce the life of a clutch in the vehicle.

As discussed above, the telematics device 120 and the portable data acquisition device 130 can communicate with hub facilities. Thus, the telematics device 120 can receive instructions from the facility that assist the vehicle operator in making repairs while the vehicle is traveling on its route. In addition, the ability to communicate with the hub allows the telematics device 120 to communicate vehicle problems in real time, which results in the earlier detection of problems. This can prevent problems from becoming more advanced and potentially causing further injury to the vehicle or the operator.

Automating Security Features

In addition to using the collected data to improve the efficiency of various elements of the delivery process and detect vehicle maintenance and repair needs, the telematics device 120 can use the data to detect certain security triggering events and, in response to detecting the security triggering event, send messages and instructions to the facility and to switching mechanisms within the vehicle. Switching mechanisms include on-board vehicle systems, ECM 205, electro-mechanical relay devices, and solid-state relay devices. For example, in one embodiment, if the telematics device 120 detects that the portable data acquisition device 130 is out of WPAN communication range with the telematics device 120 for more than a particular time period, such as, for example, twenty minutes, the telematics device 120 instructs the switching mechanism to lock the doors of the vehicle 110. In a further embodiment, the telematics device 120 is programmed to instruct the switching mechanism to prevent the engine from operating. Another method of detecting whether the portable data acquisition device 130 is a particular distance away from the telematics device 120 is by comparing the global positions of each, if the portable data acquisition device 130 is GPS-equipped.

In another embodiment, the vehicle operator, through a portable data acquisition device 130, or a facility, through a local or remote external data acquisition device 140, 150, can transmit an alarm signal to the telematics device 120 via the data radio 209, such as by depressing an alarm button. Receipt of the alarm signal by the telematics device 120 is an additional type of security triggering event. In response to receiving the alarm signal, the telematics device 120 is programmed to take a particular action to secure the vehicle 110 or the operator, such as instructing the switching mechanism to lock the doors of the vehicle and disable the engine or calling emergency personnel to the vehicle's location.

In one embodiment, a security triggering event is detected when the telematics device 120 or other data acquisition device detects that a vehicle has traveled outside the geo-fencing parameters. In response, for example, the telematics device 120 sends an alarm to the facility, which provides the facility with advance notice of potential misuse or theft of the vehicle 110. Furthermore, the ability of the telematics device 120 to track the location of the vehicle 110 in real time with the GPS sensor 202, inertia sensor, or dead reckoning ability assists the facility or emergency personnel in sending assistance to the vehicle 110 if the security of the vehicle 110 is breached or the vehicle 110 is stolen. In a further embodiment, the telematics device 120 recognizes the event if the vehicle is outside of the geo-fencing parameters for more than a certain time period, for example, fifteen minutes.

In another embodiment, the door data is compared with engine data and speed data by a portable data acquisition device. If the door data indicates a door is in an open position, the engine data indicates that the engine is running, and the speed data indicates that the vehicle is not moving, a security triggering event is detected and an alarm signal is sent to the vehicle operator or to the facility, or both, from the telematics device 120. Automating the notification assists in securing the vehicle 110. As with any of the collection and upload triggering events described above, any combination of data can be used to define a security triggering event.

In another embodiment, the RFID tag 305 in the telematics device 120 identifies the vehicle upon arrival or departure to the RFID interrogator. Having the ability to automatically identify vehicles approaching a gate allows for the automatic process of granting permission to enter or exit a facility. In one embodiment, the gate of a facility is programmed to open or close depending on receipt of permission to enter or exit.

Alternatively, the MAC address of the telematics device 120 can be used similar to automate gate entry and exit procedures.

In yet another embodiment, the telematics device 120 is programmed to send a signal to the facility mainframe computer system or the portable data acquisition device when signals from untethered trailers and containers, trailers-on-flatcars (TOFCs), and containers-on-flatcars (COFCs) are no longer received by the telematics device 120. The signal indicates that the trailer or container has been moved out of communication range with the vehicle 110 or that someone may have tampered with the transmitter, signifying a potential security breach.

Further applications of the telematics device 120 include storing video data from a video camera positioned in the cab and bulk head upon an alarm condition or other pre-determined event, storing hazardous material information regarding the vehicle's cargo and making that information available to other computing devices when requested, and comparing seat belt data with engine data or speed data to identify if a driver is operating the vehicle without using the seat belt.

Embodiments of the system described above provide an efficient data collection system for fleet management personnel, which in turn provides a more efficient approach to performing work studies on fleet operation processes. Work element measurement activity is significantly reduced and possibly eliminated by automatically collecting and analyzing the combination of known delivery point, synchronized "atomic" time, and automotive engine data. The ability to display upcoming delivery point proximity to current position reduces selection time associated with memorizing the next five stops. The ability to display upcoming delivery point proximity to the current global position of the vehicle assists the driver with deciding where to park the vehicle. Mis-delivery claims and associated driver follow-ups are also reduced and possibly eliminated by having the ability to compare a delivery point's proximity with the current global position of the vehicle. Dynamic dispatch of new time-definite delivery and pickup services are enabled by analyzing real time position, downloaded dispatch, and real time travel conditions. Asset management, inventory tracking, and security applications can be customized with respect to the territory being dispatched. A GPS and telematics-enabled DIAD makes it possible for one device to serve both feeder and package networks, and it enables a "whole" network view that standardizes service offerings. Vehicle based positioning integrated with device (DIAD) based dead reckoning allows for automatic determination of vehicle position and delivery point position. Finally, because this comprehensive telematics system is adaptable in all vehicles within the fleet, it is more efficiently installed, maintained, and improved upon.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for automating the collection of vehicle sensor data for fleet operations of a parcel delivery service, said system comprising:

a telematics device comprising an input interface for collecting data from one or more sensors disposed within a vehicle, a processor, and a first data radio for wirelessly transmitting said data, wherein said data includes a current global position of said vehicle; and a portable data acquisition device accessible to a vehicle operator, said portable data acquisition device comprising a second data radio for receiving said data from said first data radio of said telematics device, a memory for storing said data, and a data acquisition processor, wherein said memory is further configured for storing one or more pre-selected delivery positions and said data acquisition processor compares said current global position to said one or more pre-selected delivery positions, and wherein said data acquisition processor is configured for providing an estimated time of arrival to each of said one or more pre-selected delivery positions to said operator.

2. The system of claim 1 wherein said portable data acquisition device is further configured for alerting said operator if a parcel associated with a particular delivery position is delivered to an incorrect delivery position.

3. The system of claim 1 wherein the data the telematics device is capable of collecting includes at least one of door data, electronic control module trouble and diagnostic codes, geo-fencing data, alarm signals, ignition data, mileage data, seat belt data, hazardous material data of cargo, entry process number, engine data, geographical position data, routing instructions for vehicle, weather data for route, or combinations thereof.

4. The system of claim 1 wherein said portable data acquisition device is further configured to:

compare a delivery point of a parcel to said current global position; and alert said operator if said delivery point of said parcel is delivered to an incorrect delivery position based on said current global position.

5. The system of claim 2 wherein said portable data acquisition device is further configured to alert said operator of a nearest of said delivery positions to said current global position.

6. The system of claim 2 wherein said portable data acquisition device is further configured to receive a change of delivery location in response to providing said estimated time of arrival at said one or more pre-selected delivery positions.

7. The system of claim 2 wherein said alert comprises displaying a message via said portable data acquisition device viewable by said operator.

8. The system of claim 1 wherein said portable data acquisition device is configured to use said current global position to determine if said vehicle has traveled outside a first geographic area.

9. The system of claim 8 wherein said portable data acquisition device is configured to use said current global position to determine if said vehicle has traveled inside said first geographic area.

10. The system of claim 1 wherein said telematics device collects data in response to a collection triggering event.

11. The system of claim 10 wherein said collection triggering event comprises receiving a voltage signal from an ignition sensor indicating that an engine of the vehicle has been started.

12. The system of claim 10 wherein said collection triggering event comprises receiving a voltage signal from a speed sensor that a predetermined speed has been reached.

13. The system of claim 3 wherein the data collected by the telematics device includes one or more diagnostic codes.

14. The system of claim 13 wherein the one or more diagnostic codes indicate that a particular engine fluid is above a particular fluid level threshold.

15. The system of claim 13 wherein the one or more diagnostic codes indicate that a particular engine fluid is below a particular fluid level threshold.

16. The system of claim 13 wherein the one or more diagnostic codes indicate that an engine pressure exceeds a particular pressure level threshold.

17. The system of claim 13 wherein the one or more diagnostic codes indicate that an engine pressure is below a particular pressure level threshold.

18. The system of claim 3 wherein the data collected by the telematics device comprises door data indicating that a particular door is in an open position.

19. The system of claim 3 wherein the data collected by the telematics device comprises door data indicating that a particular door is in a closed position.

20. The system of claim 3 wherein the data collected by the telematics device comprises ignition data from an engine of the vehicle, wherein the ignition data indicates whether the engine is turned on.

21. A system for automating the collection of vehicle sensor data for fleet operations of a parcel delivery service, said system comprising:
a telematics device comprising an input interface for collecting data from one or more sensors that are disposed within a vehicle, a processor, and a first data radio for wirelessly transmitting said data; and
a portable data acquisition device accessible to a vehicle operator, said portable data acquisition device comprising a second data radio for receiving said data from said first data radio of said telematics device, a memory for storing said data, and a data acquisition processor,
wherein said memory of said portable data acquisition device stores threshold data parameters representative of normal vehicle operation conditions, and
wherein said data acquisition processor is configured for comparing said data collected by said telematics device to said data parameters in said memory and transmitting an alarm signal if said collected data is outside of said data parameters indicating that the vehicle needs repair or maintenance.

22. The system of claim 21 wherein said data acquisition processor is further configured for comparing said collected data to said data parameters in said memory of said data acquisition device over a time interval.

23. The system of claim 21 wherein the data the telematics device is capable of collecting includes at least one of door data, electronic control module trouble and diagnostic codes, geo-fencing data, alarm signals, ignition data, mileage data, seat belt data, hazardous material data of cargo, entry process number, engine data, geographical position data, routing instructions for vehicle, weather data for route, or combinations thereof.

24. The system of claim 23 wherein the data collected by the telematics device includes one or more diagnostic codes.

25. The system of claim 24 wherein the one or more diagnostic codes are output by an electronic control module.

26. The system of claim 24 wherein the one or more diagnostic codes indicate that a particular engine fluid is above a particular fluid level threshold.

27. The system of claim 24 wherein the one or more diagnostic codes indicate that a particular engine fluid is below a particular fluid level threshold.

28. The system of claim 24 wherein the one or more diagnostic codes indicate that an engine pressure exceeds a particular pressure level threshold.

29. The system of claim 24 wherein the one or more diagnostic codes indicate that an engine pressure is below a particular pressure level threshold.

30. The system of claim 23 wherein the data collected by the telematics device comprises door data indicating that a particular door is in an open position.

31. The system of claim 23 wherein the data collected by the telematics device comprises door data indicating that a particular door is in a closed position.

32. The system of claim 23 wherein the data collected by the telematics device comprises ignition data from an engine of the vehicle, wherein the ignition data indicates whether the engine is turned on.

33. The system of claim 22 wherein said data acquisition processor is further configured to identify an abnormal decrease in tire pressure over the time interval.

34. The system of claim 33 wherein said data acquisition processor is further configured to generate a scheduling request to maintenance personnel in response to the abnormal decrease in tire pressure over the time interval.

35. The system of claim 21 wherein said telematics device collects data in response to a collection triggering event.

36. The system of claim 35 wherein said collection triggering event comprises receiving a voltage signal from an ignition sensor indicating that an engine of the vehicle has been started.

37. The system of claim 35 wherein said collection triggering event comprises receiving a voltage signal from a speed sensor that a predetermined speed has been reached.

* * * * *